United States Patent [19]
Fini, Jr.

[11] Patent Number: 6,056,662
[45] Date of Patent: May 2, 2000

[54] REVERSE OUTPUT FROM A DIFFERENTIAL COUPLED TO A FLYWHEEL

[76] Inventor: Anthony W. Fini, Jr., 4273 Mundy St., Blasdell, N.Y. 14219

[21] Appl. No.: 08/555,275

[22] Filed: Nov. 8, 1995

Related U.S. Application Data

[63] Continuation-in-part of application No. 08/099,130, Jul. 29, 1993, abandoned.

[51] Int. Cl.[7] ........................................................ F16H 1/48
[52] U.S. Cl. ................................................ 475/224; 475/306
[58] Field of Search ............................ 475/91, 115, 198, 475/207, 210, 212, 223, 224, 300

[56] References Cited

U.S. PATENT DOCUMENTS

| | | | |
|---|---|---|---|
| 838,655 | 12/1906 | Sharp | 475/306 |
| 2,542,917 | 2/1951 | Fischer et al. | 475/224 X |
| 3,443,698 | 5/1969 | Lopez | 475/306 X |
| 4,210,229 | 7/1980 | Rees | 475/224 X |
| 5,114,386 | 5/1992 | Csotonyi | 475/212 X |

*Primary Examiner*—Khoi Q. Ta
*Attorney, Agent, or Firm*—Crossetta & Associates

[57] ABSTRACT

A high output transmission is made for increasing speed and torque from an engine or motor. It includes a planetary drive for gradually increasing speed output, a speed reducer for increasing torque output, and a friction brake which gradually slows and stops a wheel member of the planetary drive. The planetary drive wheel member is gradually slowed and stopped so that the planetary drive input to output speed ratio is increased starting from a 1 to 1 speed ratio. As the braking force is gradually increased power output is transmitted starting with a slow speed with high torque to a fast speed with lower torque and when the braking force is decreased power output resumes to a slow speed with high torque while the engine or motor can run at a set or constant speed. A clutch means is included in the transmission by the on/off action of the brake thereby providing a clutch and continuously variable transmission or CCVT. Modes of the invention are shown and described that increase the power range, decrease the required braking force, and provide reverse drive for the transmission.

1 Claim, 6 Drawing Sheets

REVERSE OUTPUT FROM A DIFFERENTIAL COUPLED TO A FLYWHEEL

This is a Continuation-In-Part of my U.S. patent application Ser. No. 099,130 filed Jul. 29, 1993, now abandoned.

BACKGROUND OF THE INVENTION

1. Field of the Invention

The present invention relates to a transmission which has in combination a speed reducer, a planetary drive, and a brake which gradually slows and stops a wheel member of the planetary drive and varies the output speed of the transmission.

2. Description of the Prior Art

The American U.S. Pat. No. 1,732,405 discloses a motor transmission unit which has an engine charging compressor for controlling the speed of a wheel member of a bevel gear type of planetary drive. The compressors resistance then varies the output speed of the transmission. This design is not efficient since it lacks a means for gradually stopping the planetary drive wheel member. The motor transmission unit is complex and does not have a simple brake which gradually slows the planetary wheel member. It also requires the addition of a separate clutch.

The American U.S. Pat. No. 4,973,295 discloses a stepless variable ratio transmission which has a worm gear assembly for controlling the speed of a wheel member of a conventional type of planetary drive. A stepping motor controls the speed of the worm and varies the speed of the transmission. This design has the disadvantage of being complex with the worm gear assembly and stepping motor. Also additional power to operate the stepping motor is required.

Furthermore, neither of the aforementioned Patents provides insights or practical solutions for reverse drive.

SUMMARY OF THE INVENTION

The invention is a very simple, efficient, and inexpensive type of transmission which even includes a clutch means. Using a well-built differential, evidenced by U.S. Pat. No. 3,406,592, as a planetary drive the invention proved its object. The combination of a speed reducer, a planetary drive, and a friction brake to gradually slow and stop a wheel member of the planetary drive works well and is less costly than other methods. Also, the friction type brake provides an excellent transmission schedule: fast acceleration and positive stopping of the planetary drive wheel member. The planetary drive wheel member is gradually slowed and stopped so that its input to output speed ratio is increased starting from a 1 to 1 speed ratio to a 1 to 2 speed ratio.

Further objects of the invention are the employment of planetary drives which provide other increased speed ratios, such as a 1 to 1 speed ratio to a 1 to 3 speed ratio, and methods that decrease the amount of braking force required to gradually slow and stop a wheel member of the planetary drive, like having the planetary drive transmitting power to the reducer instead of vice versa. Reverse drives are provided for the transmission and they include a centrifugal force type using a flywheel and other mechanical types.

DETAILED DESCRIPTION OF THE INVENTION

Figure 1:
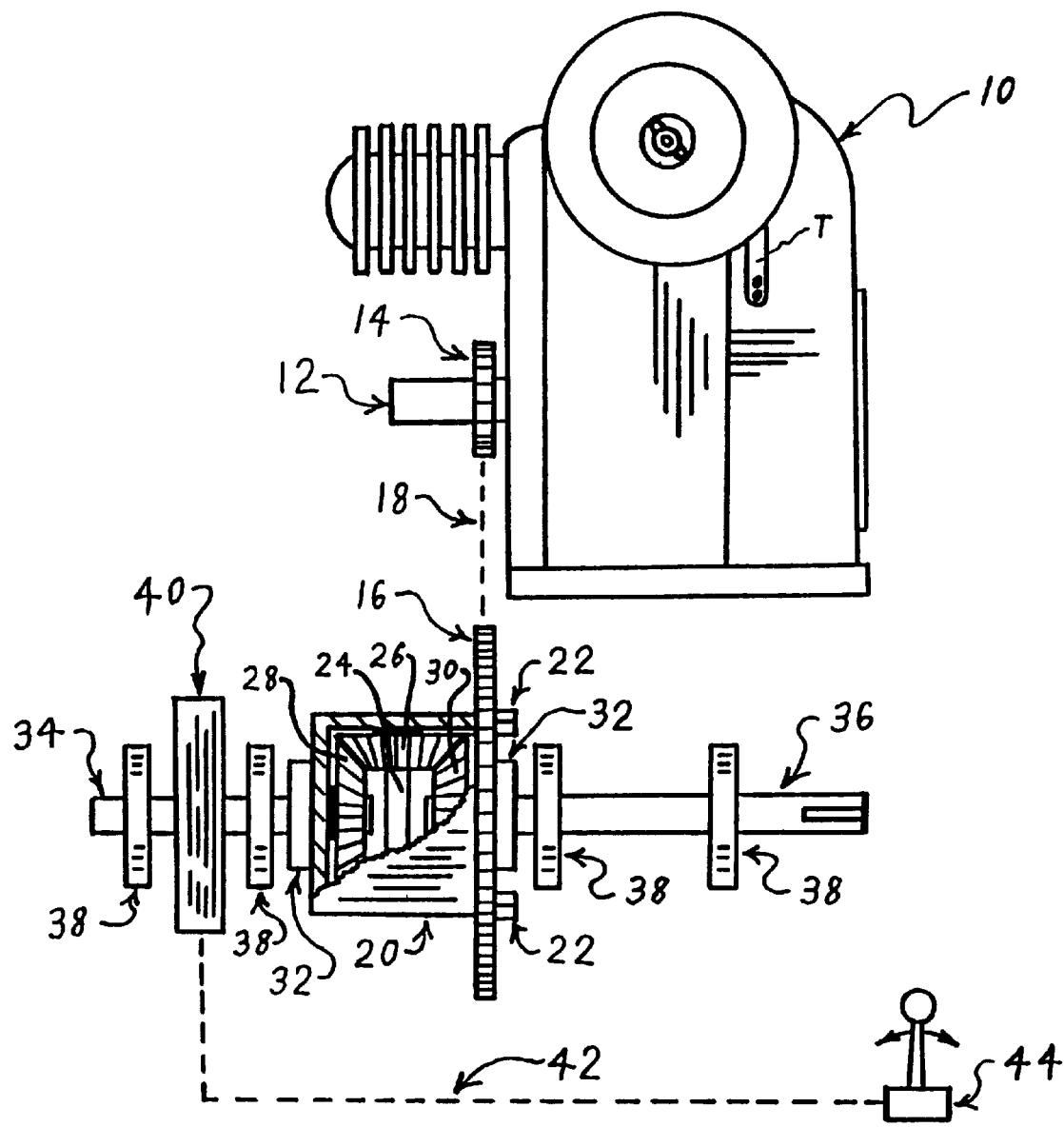
FIG. 1 is a side view of the basic invention and shows the engine and transmission. The planetary drive housing is partially cut away to show internal parts.

In FIG. 1, the engine 10 (or prime mover) has a power output or crankshaft 12. The roller chain drive includes a drive sprocket 14 which is driven by the crankshaft 12, the driven sprocket 16, and the roller chain 18. The driven sprocket 16 is connected to a housing 20 by bolts 22. The input shaft 24 is also fixed within the housing 20. Therefore the housing 20 is a mounting means for both the driven sprocket 16 and the input shaft 24. Being a totally enclosed means, it does also serve as an oil or grease lubrication retainer. A first bevel gear 28 is mounted on and drives an idler shaft 34 while a second bevel gear 30 is mounted on and drives an output shaft 36. Third bevel gears 26 are mounted on the input shaft 24 and are in mesh with the first and second bevel gears 28,30. Only one third bevel gear 26 is shown because it should be understood that most differential units incorporate at least two of these gears 26, opposite each other on the input shaft 24, for both balance and strength. However, only one of the third bevel gears 26 is actually necessary for function. The third bevel gears 26 are free to rotate about the input shaft 24. Bearings 32 support the housing 20 on the idler shaft 34 and on the output shaft 36 while allowing rotation of these shafts 34,36. Additional bearings 38 support the idler shaft 34 and the output shaft 36 and are also used to mount the planetary drive portion of the transmission. The brake 40 is a band type brake and is selectively actuated through a cable 42 by a lever 44, which can also be the accelerator pedal in this invention.

In operation, the engine 10 with its crankshaft 12 drives the drive sprocket 14. The roller chain 18 drives the driven sprocket 16, housing 20, input shaft 24, bevel gears 26,28 and the idler shaft 34. No power is transmitted to the output shaft 36 while a motor vehicle is at a standstill and the engine 10 can be at an idle or even a fast speed because, when the band brake 40 is released, the power flow is through the bevel gears 26,28 and the idler shaft 34 thereby causing the band brake 40 to act as a clutch means. As the lever 44, or the accelerator pedal, is actuated the band brake 40 through the cable 42 (or linkage) gradually slows and stops the idler shaft 34 and power is transferred to the output shaft 36 and so accelerating the vehicle forward. Since the reduction ratio of the sprockets 14,16 is fairly high, 6 to 1 ratio drive to driven, starting torque is also high. The differential, or planetary drive, input to output speed ratio is increased starting from a 1 to 1 speed ratio to a 1 to 2 speed ratio. Therefore, as the motor vehicle speed is increased and the band brake 40 stops the idler shaft 34 the speed of the output shaft 36 is increased to a 3 to 1 ratio between the engine 10 speed and the output shaft 36 speed. If the operator wishes to increase speed and/or acceleration he can do so by simply throttling the engine 10 up. When the motor vehicle is in motion and a steep grade is encountered or the operator wishes to have more torque for further acceleration it can be obtained through the transmission by decreasing the force of the band brake 40 and so causing the idler shaft 34 to rotate and increase the reduction ratio again. The operator can bring the vehicle back to a complete stop with the engine 10 still running at any predetermined set speed by just releasing the band brake 40 thereby disengaging the power transmitted by the output shaft 36.

While the basic invention has been described, many modifications are possible. For example, the band brake 40 can be easily locked up for a cruise control. The accelerator pedal or lever 44 and the throttle T of the engine 10 can be coordinated to work automatically together. The mechanical band brake 40 can be replaced with an electric brake. The roller chain 18 and sprockets 14,16 can be replaced with gears or some other type of drive.

Figure 2:
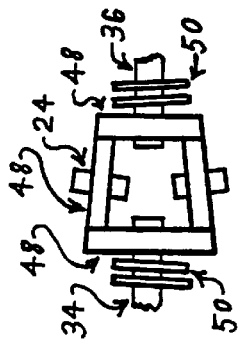
FIGS. 2, 3, and 4 are side views of different internal parts for the planetary drive.

FIG. 2 shows that the second bevel gear 30 can be made smaller than the first bevel gear 28 and so causing the input to output speed ratio to increase starting from a 1 to 1 speed ratio to a speed ratio greater than 1 to 2.

Figure 3:
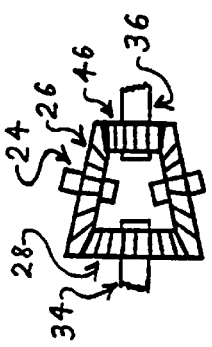

FIG. 3 shows that the second bevel gear 30 can be replaced with a plain spur gear 46 whose teeth may have only a slight chamfer.

Figure 4:
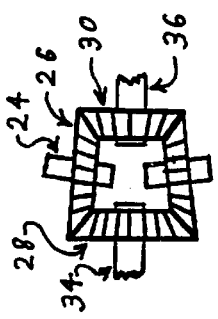

Even wheels 48, or any type disc-like structure, could be used to replace the bevel gears 26,28,30 as shown in FIG. 4. Coil springs 50 could be used for pressure against the wheels 48 with the system reassembled. Therefore, for further clarification in this invention, "wheel member" is anything wheel-like in structure such as rubber wheel, gear wheel, bevel wheel, etc.

Figure 5:
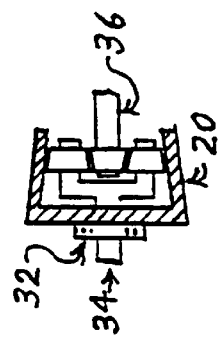
FIGS. 5 and 6 are side views of internal parts for a planetary drive having a different input style and a built-in speed increaser.
Figure 6:
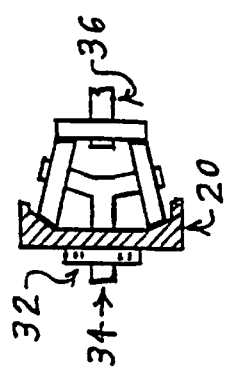
Figure 7:
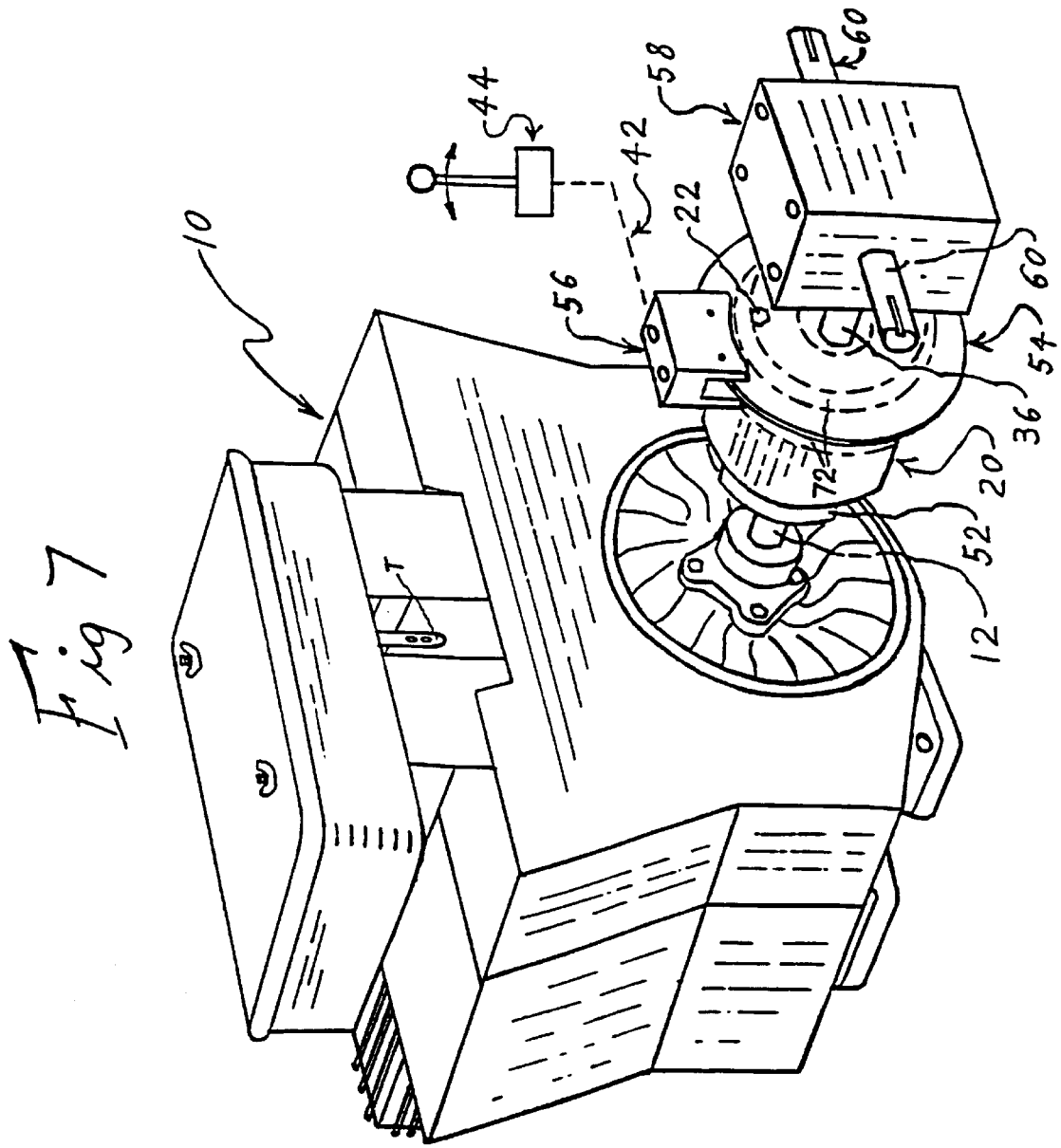
FIG. 7 is a pictorial view showing an engine and a mode of the invention wherein the planetary drive precedes the speed reducer and has planetary drive internal part styles as in FIGS. 5 and 6 and a flywheel for reverse drive is shown in phantom.

FIGS. 5 and 6 are also planetary drives but the idler shaft 34 is the input while the larger wheel member, or housing 20, is the idler and can be gradually slowed and stopped and also provide a clutch and continuously variable transmission. FIG. 7 shows an engine 10 whose output shaft 12 drives the input shaft 34 through a coupling 52. A disc brake rotar 54 is mounted to the housing 20 by bolts 22 and a disc brake caliper 56 is used to gradually slow and stop or release the housing 20. A right angle speed reducer 58 with its double output shafts 60 is shown as having its input integral with the output shaft 36. This combination again affords simplicity since the reducer could be a motor vehicles final drive and substantially reduces the braking force required to gradually slow and stop a wheel member of the planetary drive. Combining in this manner could also allow the use of a simple mechanical or an electric brake, rather than using a hydraulic or an air brake, for some larger engines.

Figure 8:
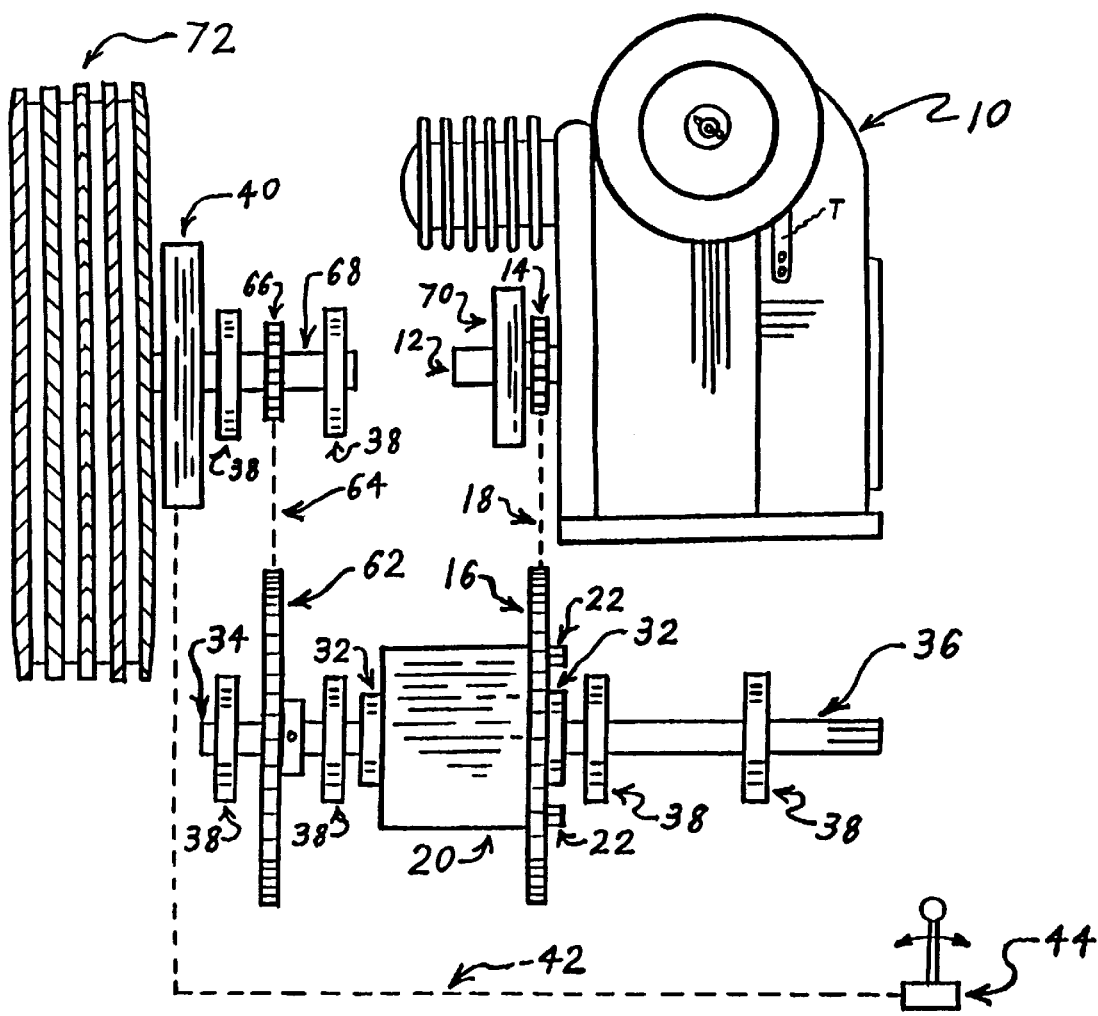
FIG. 8 is the same as FIG. 1, with the addition of a flywheel for reverse drive and an interposed speed increaser.

Another method, shown in FIG. 8, to reduce the braking force required in FIG. 1 is by adding another roller chain drive with a second shaft 68 mounted on another set of bearings 38. A large sprocket 62 is mounted on the idler shaft 34 and a smaller sprocket 66 is mounted on the second shaft 68 with a roller chain 64 connecting them. This roller chain drive could also be replaced with gears or some other type of drive. The brake 40 is mounted on the second shaft 68 which substantially lessens the braking force required to gradually slow and stop the idler shaft 34.

In addition, where the braking force is substantially reduced is an ideal mechanical advantage location to mount an optional flywheel 72, shown in FIGS. 7 and 8, for power in a reverse direction. With a motor vehicle at a standstill, accelerating the engine 10 which accelerates the flywheel 72 and then decreasing the engine 10 speed which slows the speed of the input means causes reverse rotation of the output shaft 36. Other than using an electric motor where one could simply reverse polarity, this could be one of the simplest methods for a reverse drive and is primarily intended, while not limited, for smaller light weight vehicles. In FIG. 8, the centrifugal type clutch 70, with an attached sprocket 14, is another option or addition which would prevent a motor vehicle from lunging backward when turning off a gas or gasoline engine 10. However, this drawback could also be resolved by the utilization of an engine 10 which has "Automatic Compression Release." Also, the optional flywheel 72 could make very advantageous use of a motor vehicles spare tire.

Figure 9:
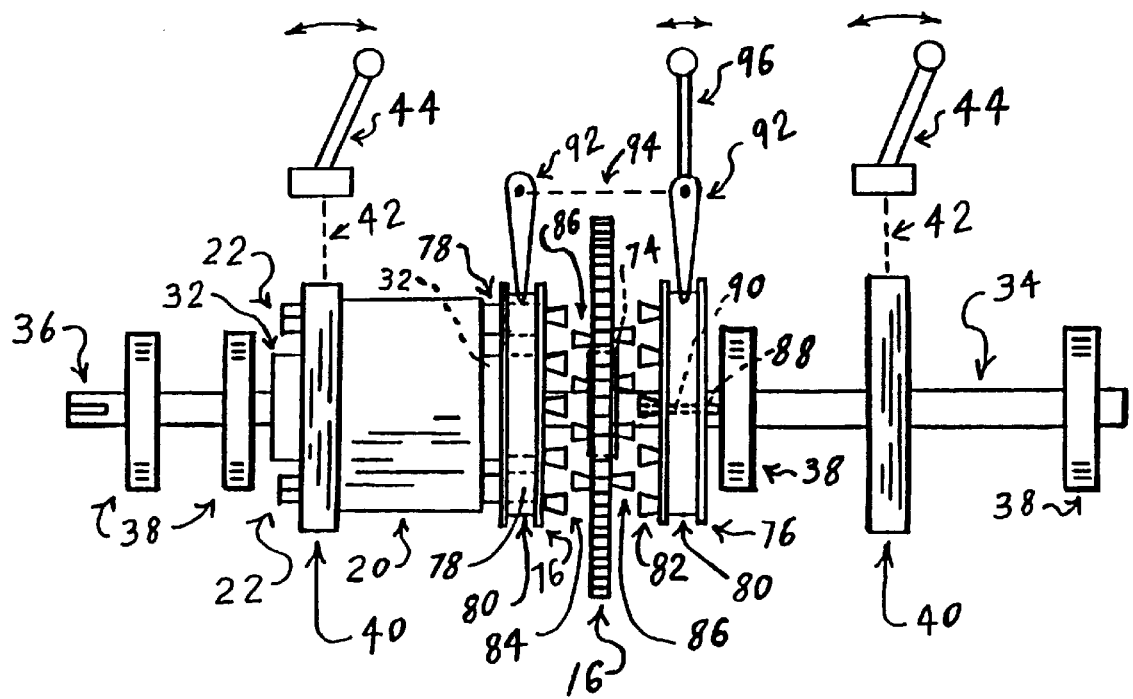
FIG. 9 is a side view showing the planetary drive portion of the basic invention with a different reverse drive.

While one method of forward/reverse has been described, FIG. 9 shows the driven sprocket 16 mounted on a bearing 74 which is mounted on the idler shaft 34. Sprocket pins 86 are attached to each side of the driven sprocket 16. The ends of the bolts 22 thread into large pins 78 and a hub 80 having flanges 76 and first pins 84 is slidably mounted on the large pins 78. Another hub 80 also having flanges 76 and second pins 82, but having an internal keyway 90, is slidably mounted on the idler shaft along a key 88 which is also mounted on the idler shaft 34. A shift lever 96 having two forks 92 connected by a linkage 94 moves the flanged hubs 80 so that the sprocket pins 86 can drive either the housing 20 or the idler shaft 34. The planetary drive is shown in a neutral position with the sprocket 16 able to revolve on its bearing 74. Another band brake 40 is mounted on the housing 20 with another lever 44 to selectively actuate it through the other cable 42 (or linkage). When the sprocket pins 86 and the first pins 84 are moved between one another through the shift lever 96 and lock the housing 20 to the driven sprocket 16 and the band brake 40 through the lever 44 slows or stops the idler shaft while power is transferred to the driven sprocket 16 the output shaft 36 rotates in the same direction as the driven sprocket 16 for forward drive. But, when the sprocket pins 86 and the second pins 82 are moved between one another through the shift lever 96 and lock the idler shaft 34 to the driven sprocket 16 and the band brake 40 through its lever 44 slows or stops the housing 20 while power is transferred to the driven sprocket 16 the output shaft 36 rotates in the opposite direction providing a reverse drive. A prototype was constructed and tested, and with very positive results. A speed reducer having a 6 to 1 ratio preceeded the planetary drive and the prototype was constructed for engines in the 20 horsepower range which have about 30 lbs.-ft. (40.674 neuton-meters) of torque output. Therefore, a band brake scheduled to gradually, but not suddenly, slow and stop 180 lbs.-ft. (244.047 neuton-meters) was selected. Since a standard differential with the same size first and second bevel gears 28,30 was used as a planetary drive, the planetary drive reverse speed ratio is the same as its forward starting speed ratio or 1 to 1.

Figure 10:
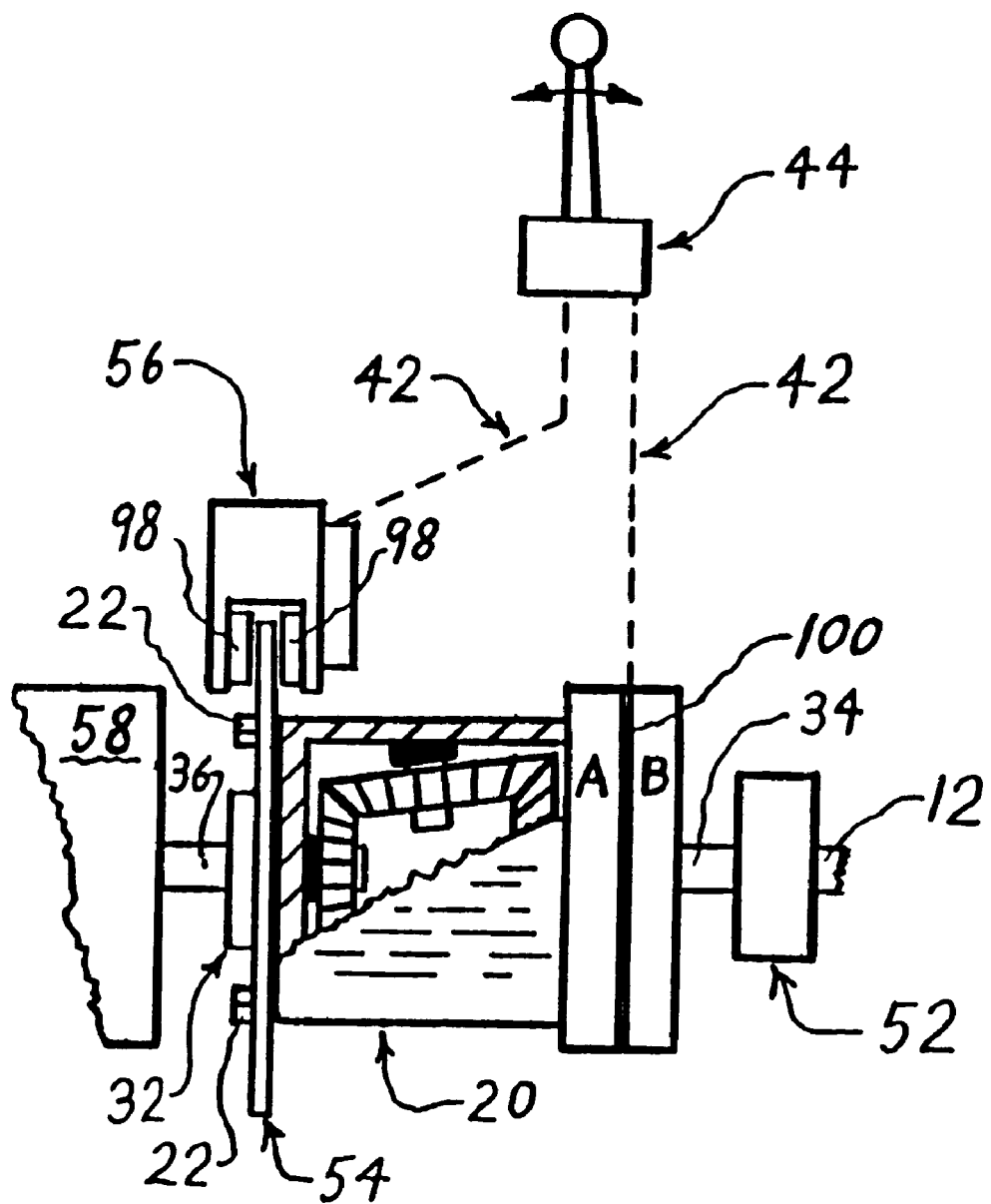
FIG. 10 is a partial side view with parts broken away for clarity and again shows a mode of the invention wherein the planetary drive precedes the speed reducer and with a different reverse drive.

Another method of forward/reverse is shown in FIG. 10. The clutch 100 is a standard type and has section A attached to the housing 20 while section B is mounted on the idler shaft 34 which again is the input in this mode of the invention. The clutch 100 is normally disengaged and the lever 44 through the cables 42 (or linkage) engage either the disc brake caliper 56 or the clutch 100. When the clutch 100 is disengaged section A is free to rotate with the housing 20 and section B is free to rotate with the input shaft 34. As the pads 98 of the disc brake caliper 56 slow and stop the disc brake rotor 54 along with the housing 20 while power is transferred to the input shaft 34 the output shaft 36 rotates in the opposite direction of the input shaft 34. However, this could still be the forward drive with the planetary drive starting at a 1 to 1 speed ratio and increasing as the housing 20 is gradually slowed and stopped. But when the clutch 100 is engaged while power is transferred to the input shaft 34 the housing 20 and the input shaft 34 are connected providing a reverse drive and at the same speed ratio as its forward starting speed ratio or 1 to 1.

While basic and preferred embodiments have been shown and described for the invention, many ways to make and use the invention are possible within the scope of the appended claims.

I claim:

1. In combination: a prime mover; a planetary drive having input drive means, output driven means and an idler wheel member; means for opposing the rotation of said idler wheel member so that said output driven means of said planetary drive delivers power in a forward direction; and a flywheel in an arrangement with said idler wheel member which enables selective opposition to the rotation of said input drive means and delivers power to said planetary drive output driven means in a direction opposite of said forward direction.

\* \* \* \* \*